(12) United States Patent
Ajiro et al.

(10) Patent No.: US 8,210,621 B2
(45) Date of Patent: Jul. 3, 2012

(54) VEHICLE BRAKE DEVICE

(75) Inventors: Keigo Ajiro, Zama (JP); Naoki Miyashita, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 1300 days.

(21) Appl. No.: 11/634,923

(22) Filed: Dec. 7, 2006

(65) Prior Publication Data

US 2007/0132312 A1   Jun. 14, 2007

(30) Foreign Application Priority Data

Dec. 8, 2005 (JP) .................... 2005-355291
Aug. 23, 2006 (JP) .................... 2006-226648

(51) Int. Cl.
    *B60T 13/68* (2006.01)
(52) U.S. Cl. ............. 303/155; 303/177; 303/113.4
(58) Field of Classification Search ........... 303/155, 303/138, 177, 113.4
    See application file for complete search history.

(56) References Cited

U.S. PATENT DOCUMENTS

| | | | |
|---|---|---|---|
| 5,816,666 A * | 10/1998 | Wiss .................... | 303/113.4 |
| 7,533,944 B2 * | 5/2009 | Mizutani et al. ........ | 303/113.4 |
| 7,748,794 B2 * | 7/2010 | Tsunehara et al. ....... | 303/155 |
| 2001/0003402 A1 * | 6/2001 | Isono et al. ............ | 303/155 |
| 2002/0153771 A1 | 10/2002 | Obuchi | |
| 2005/0040700 A1 | 2/2005 | Yokoyama et al. | |
| 2007/0159001 A1 * | 7/2007 | Miyazaki et al. ........ | 303/113.4 |

FOREIGN PATENT DOCUMENTS

| | | |
|---|---|---|
| DE | 10118635 | 5/2002 |
| EP | 1013529 | 6/2000 |
| JP | H09-290745 | 11/1997 |
| JP | 11-301434 | 11/1999 |
| JP | 2000-233733 | 8/2000 |
| JP | 2000-335402 | 12/2000 |
| JP | 2003-112617 | 4/2003 |
| JP | 2006-199265 | 8/2006 |

OTHER PUBLICATIONS

An English translation of the Office Action of corresponding Japanese Application No. 2006-226648, dated Sep. 28, 2010.

* cited by examiner

*Primary Examiner* — Bradley King
(74) *Attorney, Agent, or Firm* — Global IP Counselors, LLP

(57) ABSTRACT

A vehicle brake device is configured to limit a drop in a final target braking force when an abrupt deceleration is performed by the driver. The vehicle brake device has a brake operating element, a master cylinder and a controller. The brake operating element is operated by the driver of a vehicle. The master cylinder is operatively coupled to the brake operating element to generate a fluid pressure in accordance with an operation of the brake operating element. The controller calculates a target deceleration rate based on the fluid pressure of the master cylinder and controls a braking force of the vehicle in accordance with the target deceleration rate. The controller is limits a decrease in the target deceleration rate during an abrupt deceleration caused by the operation of the brake operating element by the driver.

14 Claims, 13 Drawing Sheets

VEHICLE BRAKE DEVICE

CROSS-REFERENCE TO RELATED APPLICATIONS

This application claims priority to Japanese Patent Application Nos. 2005-355291, filed on Dec. 8, 2005 and 2006-226648, filed on Aug. 23, 2006. The entire disclosures of Japanese Patent Application Nos. 2005-355291 and 2006-226648 are hereby incorporated herein by reference.

BACKGROUND OF THE INVENTION

1. Field of the Invention

The present invention generally relates to a vehicle brake device. More specifically, the present invention relates to a vehicle brake device that controls a braking force of the vehicle in accordance with the target deceleration rate.

2. Background Information

One example of a conventional vehicle brake device is disclosed in Japanese Laid-Open Patent Application No. 11-301434. This publication discloses a conventional vehicle brake device in which a target deceleration rate is calculated based on a master cylinder pressure and a brake pedal stroke, and the braking force of a vehicle is controlled in accordance with the target deceleration rate. A contribution ratio or a degree to which the master cylinder pressure and the brake pedal stroke contribute to the target deceleration rate varies according to at least one of the master cylinder pressure and the brake pedal stroke. The contribution ratio is set such that the degree to which the brake pedal stroke contributes to the target deceleration rate is relatively large particularly when the brake pedal is initially depressed. This is due to a general tendency among drivers to adjust the braking force primarily by adjusting the brake pedal stroke when a low deceleration rate is desired, and to adjust the braking force primarily by adjusting the pedal depression force (pedal depression pressure) when a high deceleration rate is desired.

In view of the above, it will be apparent to those skilled in the art from this disclosure that there exists a need for an improved vehicle brake device. This invention addresses this need in the art as well as other needs, which will become apparent to those skilled in the art from this disclosure.

SUMMARY OF THE INVENTION

In the conventional vehicle brake device disclosed in the above mentioned reference, the target deceleration rate is calculated based at least on the master cylinder pressure, and the braking force of the vehicle is controlled in accordance with the target deceleration rate. However, the master cylinder is provided with channels through which brake fluid is circulated to a wheel cylinder or the like for braking the vehicle, or to a stroke simulator for producing the appropriate pedal stroke and pedal reaction force when the driver operates the brake pedal.

When the brake fluid flows out of the master cylinder, the channels act as orifices. Therefore, if the driver quickly depresses the brake pedal in an attempt to suddenly decelerate, the channel resistance of the brake fluid flowing out of the master cylinder will cause the master cylinder pressure when the brake pedal is initially depressed to be higher than when the brake pedal is depressed slowly. Also, the brake pedal will become harder to depress, and thus, the brake pedal stroke in accordance with the driver's intensions will be harder to obtain due to the channel resistance resulting from the quick depressing of the brake pedal.

It is therefore considered that in order to reflect the intention of the driver starting from the initial operation of the brake pedal, the degree to which the master cylinder pressure contributes to the target deceleration rate should increase in proportion to the rate at which the driver depresses the brake pedal, and the target deceleration rate should be increased to the value desired by the driver even if the brake pedal stroke is not increased.

However, the amount of brake fluid flowing out of the master cylinder gradually decreases as the pedal becomes harder to depress due to the channel resistance. Thus, after the master cylinder pressure once increased due to the channel resistance, the master cylinder pressure decreases. Therefore, the target braking force is temporarily reduced, and thus, the braking force generated in the vehicle body decreases in spite of the increased depression of the brake pedal. In such case, the deceleration rate is output in a manner opposite to the operation of the brake pedal by the driver. Accordingly, the braking effect desired by the driver may not be achievable.

The present invention was conceived in view of the above-mentioned aspects, and one object of the present invention is to provide a vehicle brake device that can reliably reflect driver's intention when rapid braking is performed so that an adequate braking effect will be obtained.

In order to achieve the above mentioned object, a vehicle brake device is provided that basically comprises a brake operating element, a master cylinder and a controller. The brake operating element is configured and arranged to be operated by a driver of a vehicle. The master cylinder is operatively coupled to the brake operating element, and configured and arranged to generate a fluid pressure in accordance with an operation of the brake operating element. The controller is configured to calculate a target deceleration rate based on the fluid pressure of the master cylinder and to control a braking force of the vehicle in accordance with the target deceleration rate. The controller is further configured to limit a decrease in the target deceleration rate during an abrupt deceleration caused by the operation of the brake operating element by the driver.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
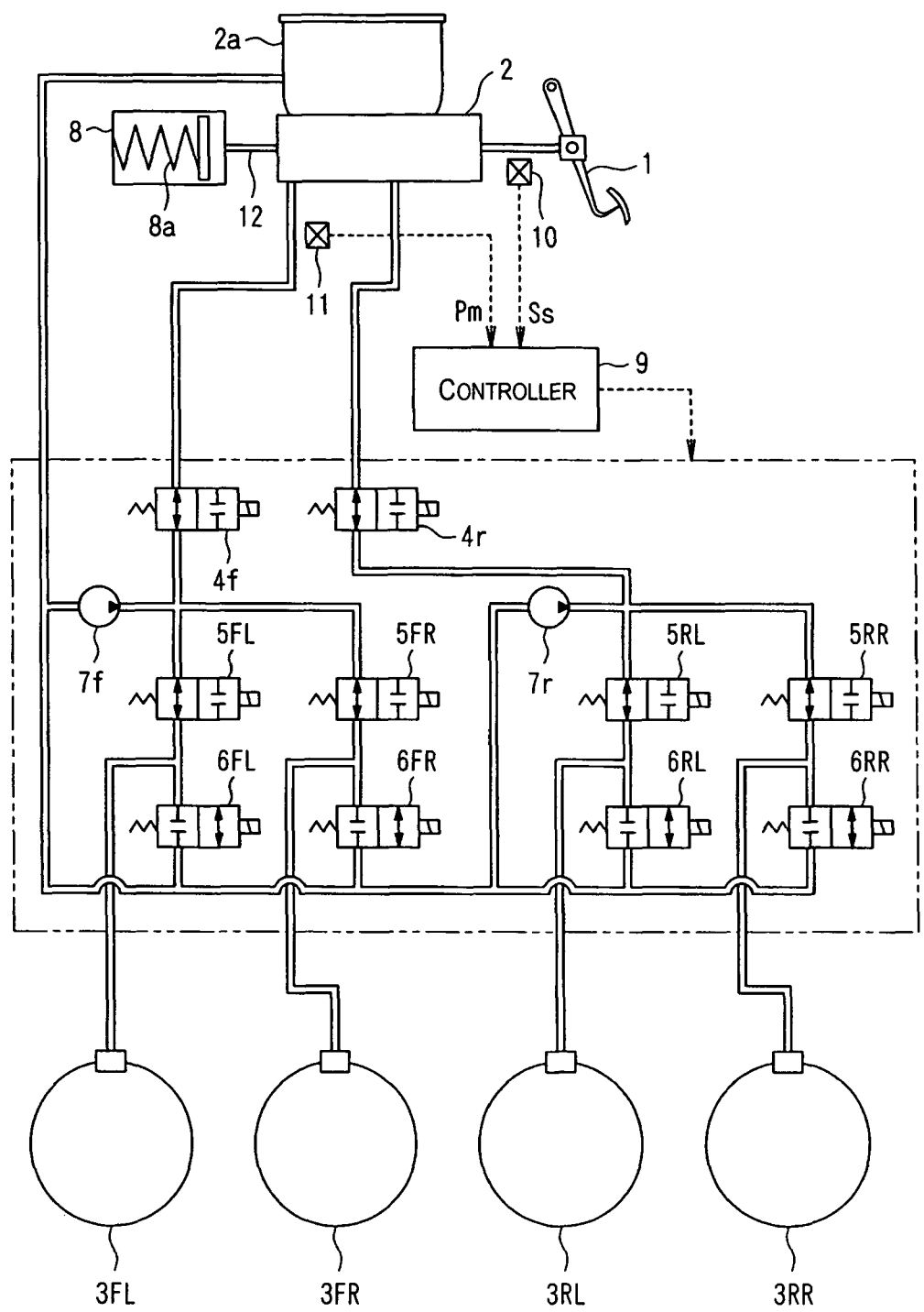
FIG. 1 is a schematic view of a vehicle brake system in which a vehicle brake device is provided in accordance with a first embodiment of the present invention.

Referring initially to FIG. 1, a vehicle brake device is illustrated in accordance with a first embodiment of the present invention. FIG. 1 is a schematic view of a vehicle brake system provided with the vehicle brake device of the first embodiment. As seen in FIG. 1, the vehicle brake system includes a brake pedal 1, a master cylinder 2, a reservoir tank 2a, a plurality of wheel cylinders (a pair of left and right rear-wheel cylinders 3RL and 3RR and a pair of left and right front-wheel cylinders 3FL and 3FR), a pair gate valves (front and rear gate valves 4f and 4r), a plurality of inlet valves (a pair of left and right rear inlet valves 5RL and 5RR and a pair of left and right front inlet valves 5FL and 5FR), a plurality of outlet valves (a pair of left and right rear outlet valves 6RL and 6RR and a pair of left and right front outlet valves 6FL and 6FR), a pair of front and rear pumps 7f and 7r, a brake simulator 8 and a controller 9.

The master cylinder 2 is configured and arranged to convert the pedal depression force that is input by a driver via the brake pedal 1 (brake operating element) to fluid pressure. The master cylinder 2 is fluidly communicated on a primary side with the left and right rear-wheel cylinders 3RL and 3RR and on a secondary side with the left and right front-wheel cylinders 3FL and 3FR. The vehicle brake system illustrated in FIG. 1 utilizes a front and rear split system in which the brake system is divided between front and rear wheels. However, it is apparent from this disclosure of the present invention that a diagonal split system may also be adopted in which the system is divided between the front left/rear right and the front right/rear left wheels in the present invention.

The wheel cylinders 3FL, 3FR, 3RL and 3RR are internally mounted in a disc brake in which a disc rotor is sandwiched between brake pads to generate a braking force or in a drum brake a brake shoe is pressed against an inner periphery of a brake drum to generate a braking force.

The fluid pressure system on the primary side includes the gate valve 4r, the inlet valves 5RL and 5RR, the outlet valves 6RL and 6RR, and the pump 7r. The gate valve 4r is configured and arranged to selectively close a channel between the master cylinder 2 and the wheel cylinders 3RL and 3RR. The inlet valves 5RL and 5RR are configured and arranged to selectively close channels between the gate valve 4r and the wheel cylinder 3RL and 3RR, respectively. the outlet valves 6RL and 6RR are configured and arranged to selectively open channels that connects the inlet valves 5RL and 5RR and the wheel cylinders 3RL and 3RR, respectively, with the reservoir tank 2a of the master cylinder 2. The pump 7r is connected to the outlet valves 6RL and 6RR and the reservoir tank 2a on its inlet side (intake side) and to the gate valve 4r and the inlet valves 5RL and 5RR on its outlet side (discharge side).

The gate valve 4r, the inlet valves 5RL and 5RR, and the outlet valves 6RL and 6RR are all respectively two-port, two-position switch/spring-loaded electromagnetic valves. The gate valve 4r and the inlet valves 5RL and 5RR are configured and arranged to open the channels when in a non-energized normal position, and the outlet valves 6RL and 6RR are configured and arranged to close the channels when in a non-energized normal position. Any configuration may be adopted for the gate valve 4r, the inlet valves 5RL and 5RR, and the outlet valves 6RL and 6RR as long as these valves are configured and arranged to selectively open and close the channels. Therefore, the gate valve 4r and the inlet valves 5RL and 5RR may open the channels when in an energized normal position, and the outlet valves 6RL and 6RR may close the channels when in an energized normal position.

The pump 7r is preferably a gear pump, a piston pump, or other displacement-type pump, that can ensure a substantially constant discharge rate independent of the load pressure.

According to the configuration described above, when the gate valve 4r is energized and closed while the inlet valves 5RL and 5RR and the outlet valves 6RL and 6RR remain in the non-energized normal position, the brake fluid in the reservoir tank 2a is suctioned in by actuating the pump 7r, and the fluid pressure of the wheel cylinders 3RL and 3RR can be increased by the resulting discharge pressure.

The channels from the wheel cylinders 3RL and 3RR to the reservoir tank 2a and the pump 7r can be shut off by energizing and closing the gate valve 4r and the inlet valves 5RL and 5RR, with the outlet valves 6RL and 6RR in the non-energized normal position. The fluid pressure of the wheel cylinders 3RL and 3RR can thereby be maintained.

Furthermore, the fluid pressure of the wheel cylinders 3RL and 3RR can be released to the reservoir tank 2a and thereby the fluid pressure of the wheel cylinders 3RL and 3RR being decreased by energizing and opening the outlet valves 6RL and 6RR and energizing and closing the gate valve 4r and the inlet valves 5RL and 5RR.

The fluid pressure from the master cylinder 2 can be transmitted to the wheel cylinders 3RL and 3RR to perform normal braking by setting the gate valve 4r, the inlet valves 5RL and 5RR, and the outlet valves 6RL and 6RR to the non-energized normal position.

Similarly to the primary side, the fluid pressure system of the secondary side is provided with the gate valve 4f, the inlet valves 5FL and 5FR, the outlet valves 6FL and 6FR, and the pump 7f. The operations of the fluid pressure system on the secondary side are also similar to the primary side, and thus, a detailed description thereof is omitted for the sake of brevity.

The stroke simulator 8 is coupled to the secondary side of the master cylinder 2 via a channel 12 and configured and arranged to produce an appropriate pedal stroke and pedal reaction force in response to the operation of the brake pedal 1 by the driver. The stroke simulator 8 is preferably a single action cylinder for elastically creating a stroke based on the fluid pressure from the master cylinder 2. Specifically, the stroke simulator 8 includes a spring-shaped accumulator having a compression spring 8a interposed between the bottom of the cylinder and a piston. The pedal stroke and pedal reaction force are produced when the compression spring 8a is elastically compressed in conjunction with an increase in fluid pressure in the master cylinder 2.

The controller 9 preferably includes a microcomputer with a braking force control program that controls the vehicle brake system as discussed below. The controller 9 can also include other conventional components such as an input interface circuit, an output interface circuit, and storage devices such as a ROM (Read Only Memory) device and a RAM (Random Access Memory) device. The microcomputer of the controller 9 is programmed to control the various components such as the gate valves 4f and 4r, the inlet valves 5FL to 5RR, the outlet valves 6FL to 6RR, and the pumps 7f and 7r. The memory circuit stores processing results and control programs such as ones for final target deceleration rate calculation operation that are run by the processor circuit. The controller 9 is operatively coupled to the various components of the vehicle brake system in a conventional manner. The internal RAM of the controller 9 stores statuses of operational flags and various control data. The controller 9 is capable of selectively controlling any of the components of the vehicle brake system in accordance with the control program. It will be apparent to those skilled in the art from this disclosure that the precise structure and algorithms for the controller 9 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The controller 9 is operatively coupled to a stroke sensor 10 and a pressure sensor 11. The controller 9 is configured to receive a signal indicative of a brake pedal stroke Ss outputted from the stroke sensor 10 and a signal indicative of a master cylinder pressure outputted from the pressure sensor 11.

Moreover, the controller 9 is configured to drive and control the gate valves 4f and 4r, the inlet valves 5FL to 5RR, the outlet valves 6FL to 6RR, and the pumps 7f and 7r. The controller 9 is configured to execute the brake force control process (described hereinafter) shown in the flowchart of FIG. 2 based on the brake pedal stroke Ss and the master cylinder pressure Pm in the normal conditions, thereby executing brake-by-wire control while the gate valves 4f and 4r are closed. In the event of a fail-safe due to pump failure or another reason, the gate valves 4f and 4r are opened and the fluid pressure is transmitted from the master cylinder 2 to the wheel cylinders 3FL to 3RR to execute normal (hydraulic) braking.

Figure 2:
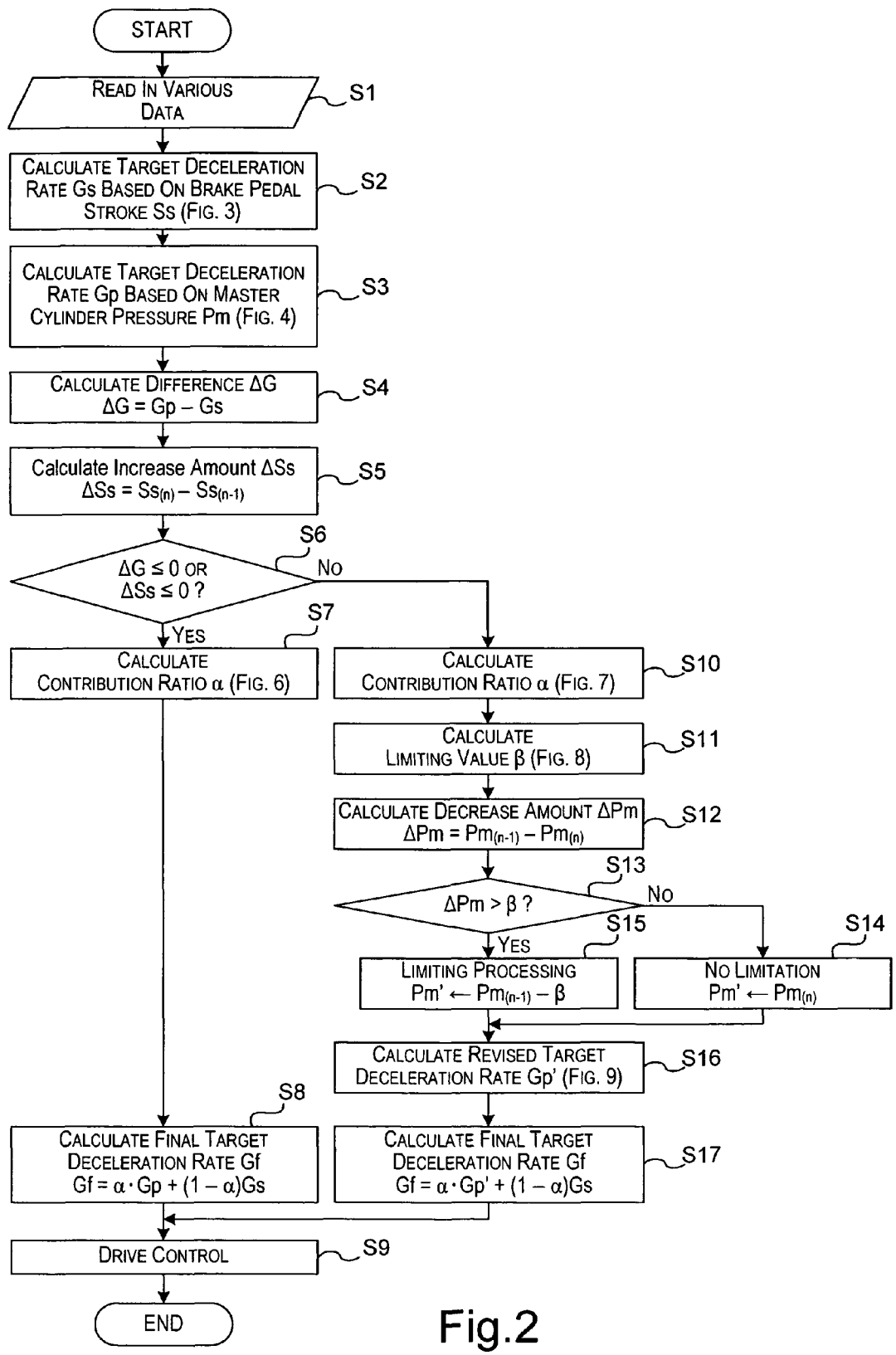
FIG. 2 is a flowchart illustrating a braking force control process executed in the vehicle brake device in accordance with the first embodiment of the present invention.

Referring now to the flowchart of FIG. 2, the brake force control process executed by the controller 9 will be explained. The brake force control process illustrated in FIG. 2 is executed by a timer interrupt at a prescribed timing interval (e.g., 10 msec).

First, in step S1, the controller 9 is configured to retrieve the brake pedal stroke Ss and the master cylinder pressure Pm detected by the stroke sensor 10 and the pressure sensor 1.

Figure 3:
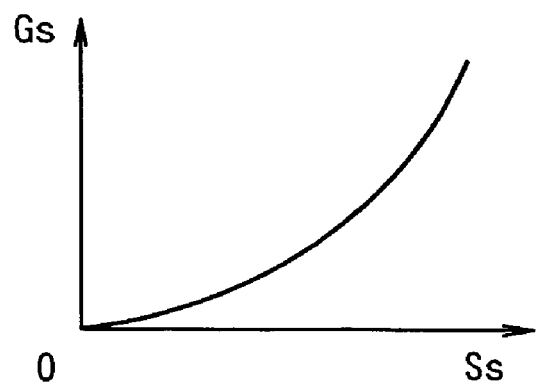
FIG. 3 is a schematic diagram illustrating a control map used in the braking force control process to calculate a target deceleration rate based on a brake pedal stroke in accordance with the first embodiment of the present invention.

In step S2, the controller 9 is configured to calculate a target deceleration rate Gs according to the brake pedal stroke Ss using a control map such as one illustrated in FIG. 3. In the control map shown in FIG. 3, the brake pedal stroke Ss is shown on the horizontal axis, and the target deceleration rate Gs is shown on the vertical axis. The control map is configured so that the target deceleration rate Gs increases from zero as the brake pedal stroke Ss increases from zero, and the rate at which the target deceleration rate Gs increases becomes higher as the pedal stroke increases.

Figure 4:
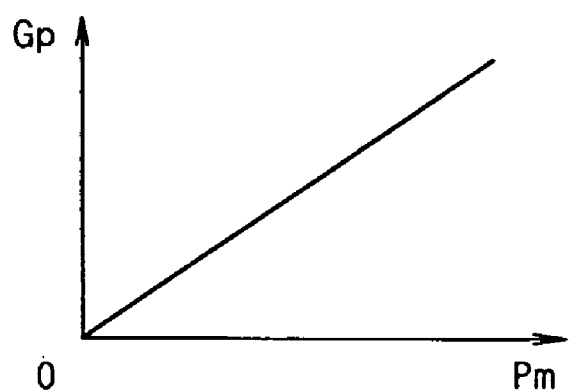
FIG. 4 is a schematic diagram illustrating a control map used in the braking force control process to calculate a target deceleration rate based on a master cylinder pressure in accordance with the first embodiment of the present invention.

In step S3, the controller 9 is configured to calculate a target deceleration rate Gp (first target deceleration rate) according to the master cylinder pressure Pm using a control map such as one illustrated in FIG. 4. In the control map shown in FIG. 4, the master cylinder pressure Pm is shown on the horizontal axis, and the target deceleration rate Gp is shown on the vertical axis. The target deceleration rate Gp increases proportionately from zero as the master cylinder pressure Pm increases from zero.

In step S4, the controller 9 is configured to calculate a difference $\Delta G$ between the target deceleration rate Gp according to the master cylinder pressure and the target deceleration rate Gs according to the brake pedal stroke Ss by using the equation (1) below.

$$\Delta G = Gp - Gs \quad (1)$$

In step S5, the controller 9 is configured to subtract the previously sampled pedal stroke $Ss_{(n-1)}$ from the currently sampled pedal stroke $Ss_{(n)}$ to calculate an increase amount $\Delta Ss$ of the brake pedal stroke Ss by using the equation (2) below.

$$\Delta Ss = Ss_{(n)} - SS_{(n-1)} \quad (2)$$

In step S6, the controller 9 is configured to determine whether the difference $\Delta G$ is 0 or less, or whether the increase amount $\Delta Ss$ is 0 or less.

Figure 5:
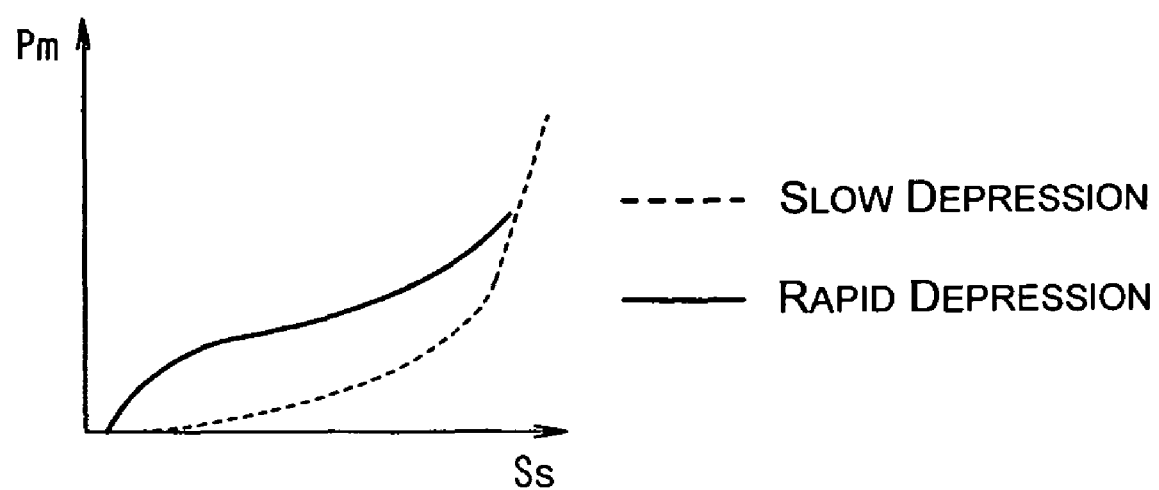
FIG. 5 is a schematic diagram illustrating a relationship between the brake pedal stroke Ss and the master cylinder pressure in accordance with the first embodiment of the present invention.

The channel 12 connecting the master cylinder 2 and the stroke simulator 8 acts as the main orifice for the brake fluid flowing from the master cylinder 2 to the stroke simulator 8. Therefore, when a driver wishes to decelerate quickly and suddenly depresses the brake pedal 1 (during an abrupt deceleration), the rate at which the brake fluid flows from the master cylinder 2 to the stroke simulator 8 is restricted by the resistance of the channel 12 when the brake pedal 1 is initially depressed. The master cylinder pressure Pm is therefore greater when the brake pedal 1 is rapidly depressed than when the brake pedal 1 is gradually depressed. FIG. 5 illustrates the relationship between the brake pedal stroke Ss and the master cylinder pressure Pm. As shown in FIG. 5, the master cylinder pressure Pm is greater when the brake pedal 1 is operated quickly than when the brake pedal 1 is operated slowly, even if the brake pedal stroke Ss is the same, as shown in FIG. 5.

When the difference $\Delta G$ is greater than zero ($\Delta G>0$) and the increase amount $\Delta Ss$ is greater than zero ($\Delta Ss>0$) in step S6 (i.e., when the target deceleration rate Gs according to the brake pedal stroke Ss is smaller than the target deceleration rate Gp according to the master cylinder pressure Pm (Gs<Gp), and the brake pedal stroke Ss shows a tendency to increase), the controller 9 is configured to determine that the driver has suddenly operated the brake pedal 1, and the process proceeds to step S10 (described later). On the other hand, the difference $\Delta G$ is equal to or less than zero ($\Delta G \leq 0$) or the increase amount $\Delta Ss$ is equal to or less than zero ($\Delta Ss \leq 0$) in step S6 (i.e., when the target deceleration rate Gs according to the brake pedal stroke Ss is equal to or larger than the target deceleration rate Gp according to the master cylinder pressure Pm ($Gs \geq Gp$), or the brake pedal stroke Ss does not show a tendency to increase, the controller 9 is configured to determine that quick braking has not taken place, and the process proceeds to step S7.

Figure 6:
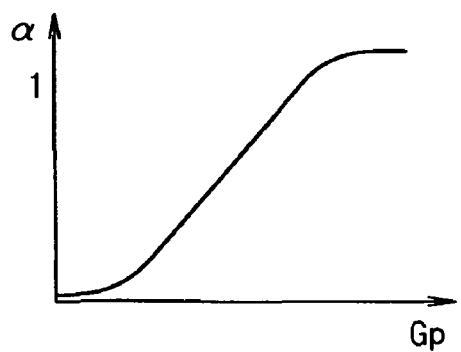
FIG. 6 is a schematic diagram illustrating a control map used in the braking force control process to calculate a contribution ratio under ordinary conditions in accordance with the first embodiment of the present invention.

In step S7, the controller 9 is configured to calculate a contribution ratio $\alpha$ to which the target deceleration rates Gs and Gp contribute to a final target deceleration rate Gf based on the master cylinder pressure Pm using a control map such as one illustrated in FIG. 6. In the control map shown in FIG. 6, the master cylinder pressure Pm is shown on the horizontal axis, and the contribution ratio $\alpha$ is shown on the vertical axis. The contribution ratio $\alpha$ increases over a range of 0 to 1 according to the increase of the master cylinder pressure Pm.

In step S8, the controller 9 is configured to calculate the final target deceleration rate Gf based on the target deceleration rates Gp and Gs and the contribution ratio $\alpha$ by using the equation (3) below.

$$Gf = \alpha \times Gp + (\alpha - 1)Gs \qquad (3)$$

According to the equation (3), the degree to which the brake pedal stroke Ss contributes to the final target deceleration rate Gf increases and the degree of contribution of the master cylinder pressure Pm decreases as the contribution ratio $\alpha$ increases. On the other hand, the degree to which the brake pedal stroke Ss contributes to the final target deceleration rate Gf decreases and the degree of contribution of the master cylinder pressure Pm increases as the contribution ratio $\alpha$ decreases.

In step S9, the controller 9 is configured to drive and control the gate valves 4f and 4r, the inlet valves 5FL to 5RR, the outlet valves 6FL to 6RR, and the pumps 7f and 7r to generate the necessary braking force to achieve the final target deceleration rate Gf, and the process returns to a prescribed main program.

Figure 7:
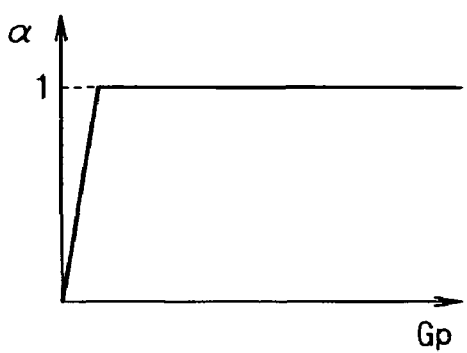
FIG. 7 is a schematic diagram illustrating a control map used in the braking force control process to calculate the contribution ratio during abrupt brake operation in accordance with the first embodiment of the present invention.

On the other hand, when the determination result in step S6 is such that the difference $\Delta G$ is larger than zero and the increase amount $\Delta Ss$ is larger than zero (No in step S6), in step S10, the controller 9 is configured to calculate the contribution ratio $\alpha$ to which the target deceleration rates Gs and Gp contribute to the final deceleration rate Gf according to the master cylinder pressure Pm using a control map such as one illustrated in FIG. 7. In the control map shown in FIG. 7, the master cylinder pressure Pm is shown on the horizontal axis, and the contribution ratio $\alpha$ is shown on the vertical axis. As shown in FIG. 7, the value of the contribution ratio $\alpha$ becomes 1 immediately when the master cylinder pressure Pm is generated.

Figure 8:
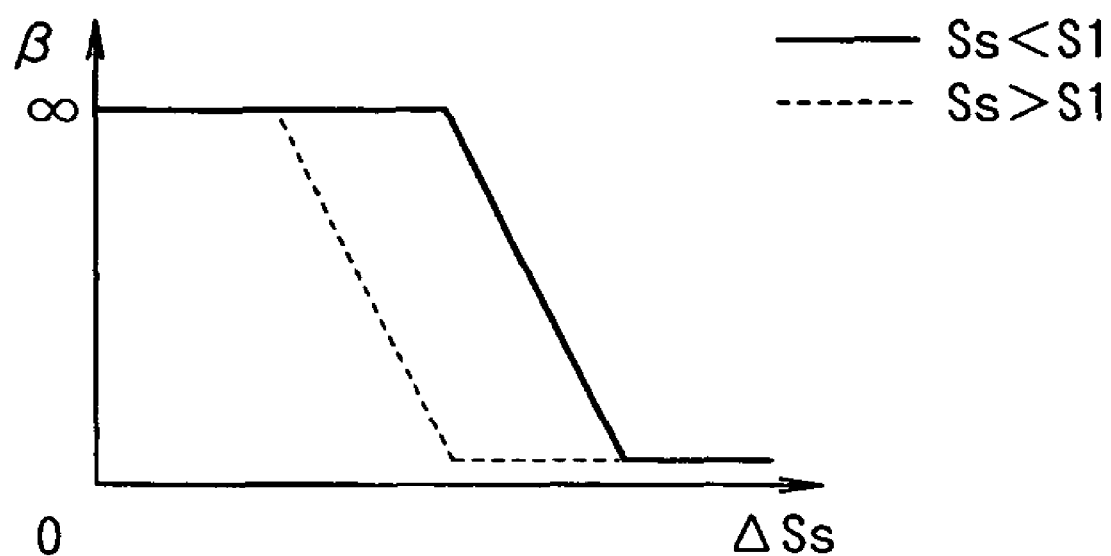
FIG. 8 is a schematic diagram illustrating a control map used in the braking force control process to calculate a limiting value that limits a decrease in a target deceleration rate in accordance with the first embodiment of the present invention.

In step S11, the controller 9 is configured to calculate a limiting value $\beta$ for limiting a decrease in the master cylinder pressure Pm based on the brake pedal stroke Ss and the increase amount $\Delta Ss$ of the brake pedal stroke Ss using a control map such as one illustrated in FIG. 8. In the control map shown in FIG. 8, the increase amount $\Delta Ss$ is shown on the horizontal axis, and the limiting value $\beta$ is shown on the vertical axis. As shown in FIG. 8, the limiting value $\beta$ generally decreases as the increase amount $\Delta Ss$ increases. Moreover, the limiting value $\beta$ is generally smaller when the brake pedal stroke Ss is greater than a prescribed value S1 as compared to when the brake pedal stroke Ss is less than the prescribed value S1.

In step S12, the controller 9 is configured to subtract the currently sampled master cylinder pressure $Pm_{(n)}$ from the previously sampled master cylinder pressure $Pm_{(n-1)}$ to calculate the decrease amount $\Delta Pm$ of the master cylinder pressure Pm by using the equation (4) below.

$$\Delta Pm = Pm_{(n-1)} - Pm_{(n)} \qquad (4)$$

In step S13, the controller 9 is configured to determine whether the decrease amount $\Delta Pm$ of the master cylinder pressure Pm is greater than the limiting value $\beta$. If the decrease amount $\Delta Pm$ is not greater than the limiting value $\beta$ ($\Delta Pm \leq \beta$), the controller 9 is configured to determine that the decrease amount $\Delta Pm$ in the master cylinder pressure Pm is within an acceptable range, and the process proceeds to step S14. On the other hand, f the decrease amount $\Delta Pm$ is greater than the limiting value $\beta$ ($\Delta Pm > \beta$), the controller 9 is configured to determine that the decrease amount $\Delta Pm$ in the master cylinder pressure Pm has exceeded the acceptable range, and the process proceeds to step S15.

In step S14, the controller 9 is configured to determine a revised master cylinder pressure Pm' by directly substituting the currently sampled master cylinder pressure $Pm_{(n)}$ for the revised master cylinder pressure Pm' by using the equation (5) below.

$$Pm' \leftarrow Pm_{(n)} \qquad (5)$$

In other words, in step S14, no limit is imposed on the master cylinder pressure Pm. Then, the process proceeds to step S116.

On the other hand, in step S15, the controller 9 is configured to subtract the limiting value $\beta$ from the previously sampled master cylinder pressure $Pm_{(n-1)}$ to obtain the revised master cylinder pressure Pm' by using the equation (6) below.

$$Pm' \leftarrow Pm_{(n-1)} - \beta \qquad (6)$$

In other words, when the decrease amount $\Delta P$ of the master cylinder pressure Pm is large, the limiting value $\beta$, which is smaller than the decrease amount $\Delta P$, is subtracted from the previously sampled master cylinder pressure $Pm_{(n-1)}$ instead of the decrease amount $\Delta P$. Therefore, the decrease in the master cylinder pressure Pm is limited by the limiting value $\beta$ in step S15. Then, the process proceeds to step S16.

Figure 9:
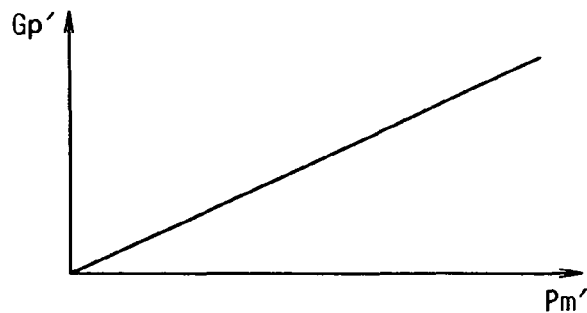
FIG. 9 is a schematic diagram illustrating a control map used in the braking force control process to calculate a revised target deceleration rate based on a revised master cylinder pressure in accordance with the first embodiment of the present invention.

In step S16, the controller 9 is configured to calculate a revised target deceleration rate Gp' according to the revised master cylinder pressure Pm' using a control map such as one illustrated in FIG. 9. In the control map shown in FIG. 9, the revised master cylinder pressure Pm' is shown on the horizontal axis, and the revised target deceleration rate Gp' is shown on the vertical axis. The revised target deceleration rate Gp' increases proportionately from zero as the revised master cylinder pressure Pm' increases from zero, in the same manner as the control map in FIG. 4 described above. The revised master cylinder pressure Pm' will be used as the previously sampled master cylinder pressure $Pm_{(n-1)}$ in the subsequent calculation cycle.

In step S17, the controller 9 is configured to calculate the final target deceleration rate Gf based on the revised target deceleration rate Gp', the target deceleration rate Gs according to the brake pedal stroke Ss and the contribution ratio α by using the equation (7) below. Then, the process proceeds to the above-mentioned step S9.

$$Gf = \alpha \times Gp' + (\alpha - 1)Gs \quad (7)$$

Next, the operational effects of the first embodiment will be described.

As mentioned above, when the vehicle is driving in the normal conditions, the brake-by-wire control is performed. Specifically, the controller 9 is configured to drive and control the inlet valves 5FL to 5RR, the outlet valves 6FL to 6RR, and the pumps 7f and 7r while the gate valves 4f and 4r are maintained in the closed state to perform braking control according to the operation of the brake pedal 1 by the driver.

More specifically, the controller 9 is configured to calculate the target deceleration rate Gs and the target deceleration rate Gp based on the brake pedal stroke Ss and the master cylinder pressure Pm, respectively (steps S2 and S3). The controller 9 is then configured to calculate the final target deceleration rate Gf based on these target deceleration rates Gs and Gp (step S8), and to perform the braking control by driving the inlet valves 5FL to 5RR, the outlet valves 6FL to 6RR, and the pumps 7f and 7r according to the final target deceleration rate Gf (step S9).

Figure 10:
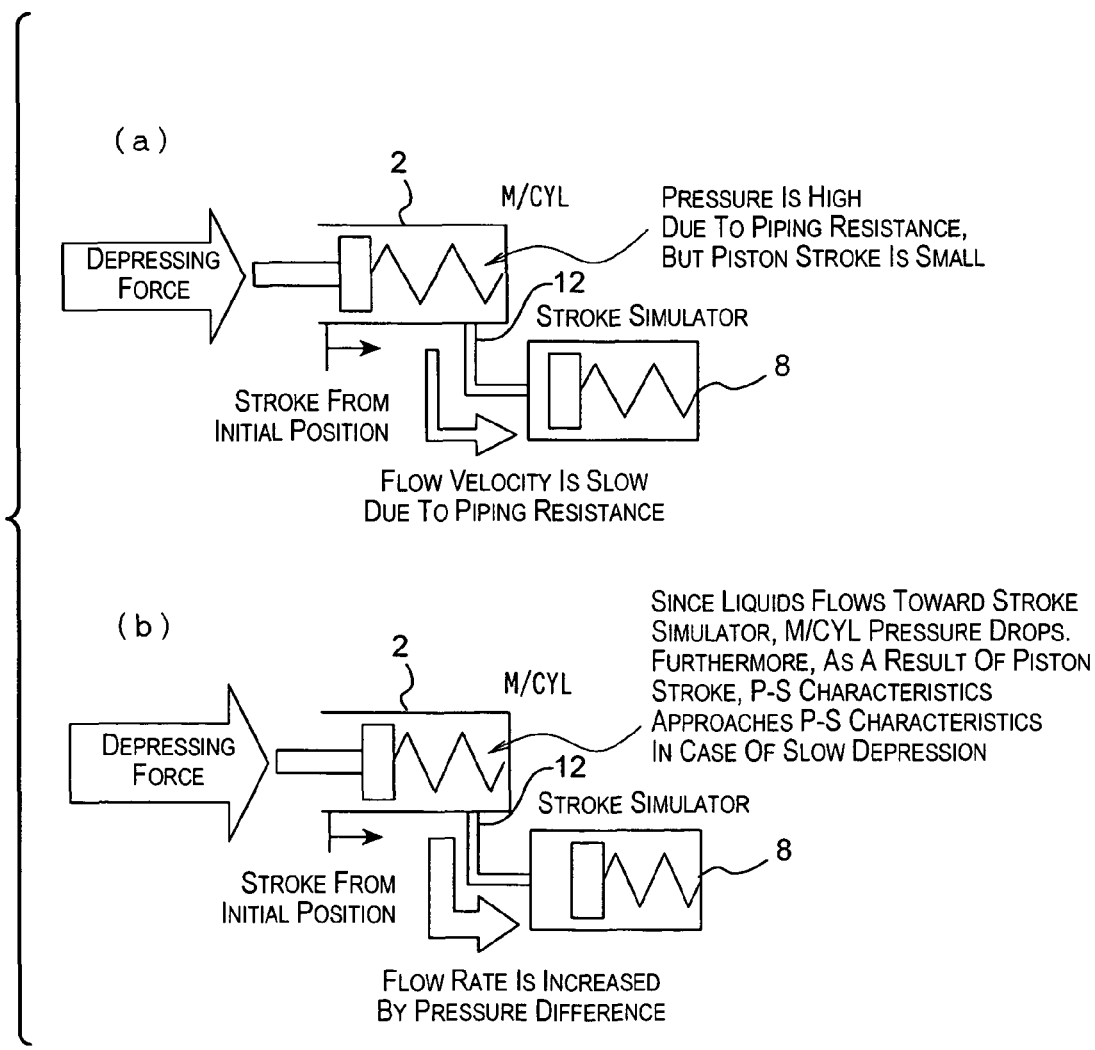
FIG. 10 includes a pair of diagrams (a) and (b) for illustrating operations of the master cylinder and the brake simulator during the abrupt brake operation in accordance with the first embodiment of the present invention.

As described above, when the driver wishes to decelerate quickly and suddenly depresses the break pedal 1, the rate at which the brake fluid flows from the master cylinder 2 to the stroke simulator 8 through the channel 12 is restricted due to the channel resistance of the channel 12 when the brake pedal 1 is initially depressed as shown in the diagram (a) of FIG. 10. Thus, when the brake pedal 1 is initially depressed, the master cylinder pressure Pm is therefore greater when the brake pedal 1 is quickly depressed than when the brake pedal 1 is gradually depressed. The brake pedal stroke Ss is not as large as expected by the driver due to the channel resistance of the channel 12.

If the final target deceleration rate Gf is calculated with the contribution degree of the brake pedal stroke Ss being increased when the brake pedal 1 is initially depressed by the driver to perform quick braking, the degree to which the increase of the master cylinder pressure Pm contributes to an increase in the final target deceleration rate Gf decreases. As a result, even though the driver will depress the brake pedal 1 quickly to suddenly decelerate, the stroke of the brake pedal 1 will not be as expected due to the resistance in the channel 12. Consequently, in such case, the final target deceleration rate Gf does not increase as much as the driver desires, and a demand for deceleration is adjusted in a direction that contradicts the actions (brake pedal operation) of the driver when the brake pedal 1 is initially depressed.

Therefore, in the present invention, in order to reflect the intentions of the driver from the initial operation of the brake, the controller 9 is configured to calculate the final target deceleration rate Gf such that the quicker the driver depresses the brake pedal, the greater the contribution ratio α to which the master cylinder pressure Pm contributes to the final target deceleration rate Gf becomes. Thus, with the present invention, the final target deceleration rate Gf is increased to the level desired by the driver even when the brake pedal stroke Ss is not large when the brake pedal 1 is initially depressed by the driver to perform abrupt braking.

Figure 11:
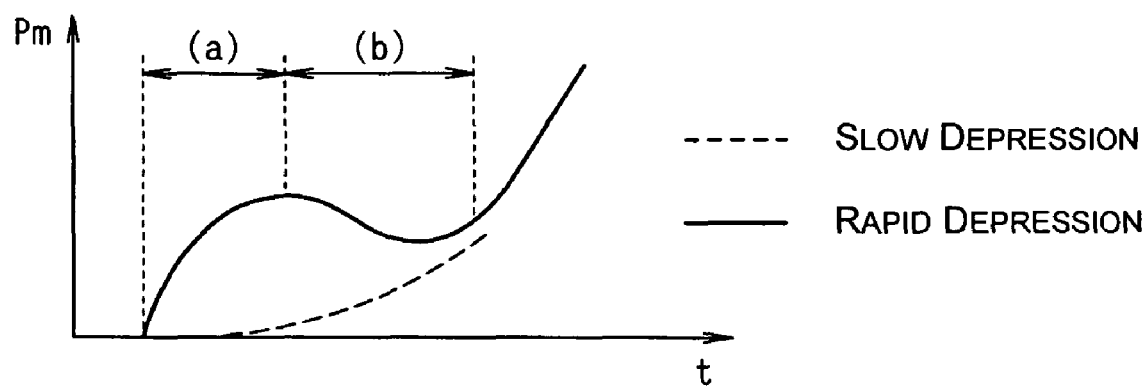
FIG. 11 is a time chart illustrating a change in the master cylinder pressure with respect to time during the abrupt brake operation in accordance with the first embodiment of the present invention.

However, the rate at which the brake fluid flows from the master cylinder 2 to the stroke simulator 8 gradually increases, and thus, the amount of the brake fluid flows to the stroke simulator 8 increases as shown in the diagram (b) of FIG. 10. Therefore, if the master cylinder pressure Pm is observed in chronological order as shown in FIG. 11, then when the brake pedal 1 is initially depressed, the master cylinder pressure Pm dramatically increases. However, since the brake stroke is limited by the channel resistance of the channel 12, the flow of the brake fluid is decreased whereupon the master cylinder pressure Pm decreases. The regions (a) and (b) shown in the timing chart in FIG. 11 correspond to the states shown in the diagrams (a) and (b) of FIG. 10, respectively. In the diagram (b) of FIG. 10 and the region (a) of FIG. 11, if the contribution ratio α of the master cylinder pressure Pm on the final target deceleration rate Gf is increased, then the final target deceleration rate Gf inevitably decreases, albeit temporarily, according to the decrease in the master cylinder pressure Pm. In such case, the deceleration rate generated in the vehicle conversely decreases despite the brake pedal 1 being depressed further by the driver.

Therefore, in the present embodiment, when the target deceleration rate Gp according to the master cylinder Pm is greater than the target deceleration rate Gs according to the brake pedal stroke Ss and the brake pedal stroke Ss is tending to increase (No in step S6), the controller 9 is configured to determine that the driver has performed quick braking and the master cylinder pressure Pm will tend to decrease. Thus, the controller 9 is configured to limit or prevent the decrease in the final target deceleration rate Gf by calculating the revised master cylinder pressure Pm' in which the decrease in the master cylinder pressure Pm is limited by the limiting value β.

More specifically, first, the contribution ratio α is set to 1 so that the target deceleration rate Gp will remain the final target deceleration rate Gf (step S10), and then the decrease in the master cylinder pressure Pm in every calculation period will be limited to the limiting value β or less (steps S13 to S15). The revised target deceleration rate Gp' is calculated based on the revised master cylinder pressure Pm' that has been limited as described above (step S116), and the revised target deceleration rate Gp' will be used as the final target deceleration rate Gf (step S17), thereby limiting the decrease in the final target deceleration rate Gf.

Figure 12:
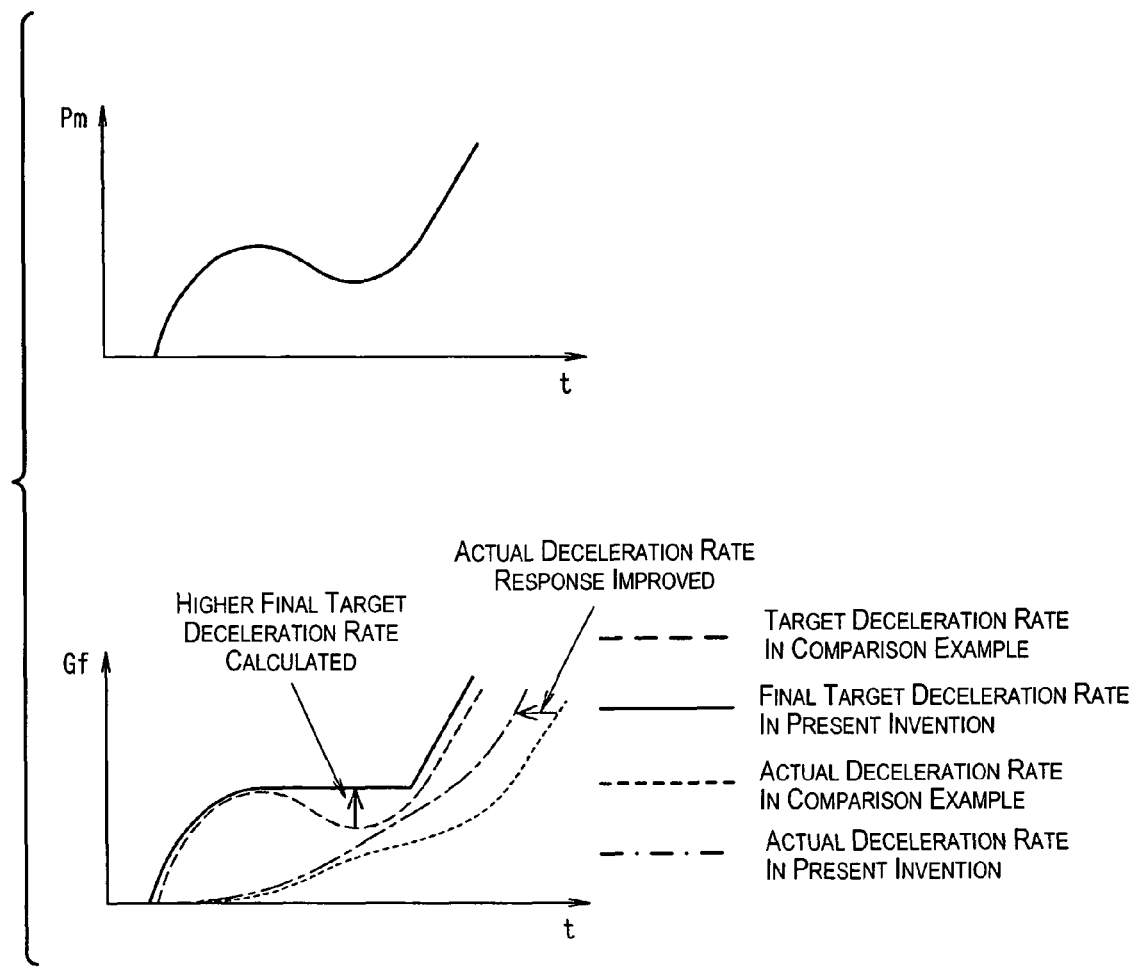
FIG. 12 is a time charts illustrating operation effects in the final target deceleration rate and the actual deceleration rate during the abrupt brake operation in accordance with the first embodiment of the present invention.

Thus, as shown in FIG. 12, even if the actual master cylinder pressure Pm is temporarily reduced, the decrease in the final target deceleration rate Gf will be limited due to the use of the revised target deceleration rate Gp', which is obtained by limiting the decrease in the target deceleration rate Gp (the master cylinder pressure Pm). Therefore, with the present invention, the responsiveness of the actual vehicle deceleration rate can be improved as shown in FIG. 12. Moreover, braking delay can be prevented. Furthermore, the deceleration rate generated in the vehicle body will not decrease when the brake pedal 1 is depressed further, and it becomes possible to minimize the incidence of discomfort that arises when a demand for deceleration contradicts the actions of the driver. The range of limitation in regard to the decrease in the final target deceleration rate Gf and the target deceleration rate Gp are arranged within the allowable range of decrease such that the decrease in the deceleration rate generated in the vehicle body is not noticeable by the driver.

If the brake pedal stroke Ss increases quickly, it can be determined that the driver has issued a command for strong braking and therefore desires a dramatic deceleration rate. Therefore, a quicker increase in the brake pedal stroke Ss (i.e., a higher increase amount ΔSs in every calculation period) will result in the limiting value β being set to a smaller value, and the limit to the decrease in the target deceleration rate Gp being made more stringent (step S11).

Thus, when the driver quickly depresses the brake pedal 1 with considerable force, and the limiting value β is set to a very small value (e.g., 0), a decrease in the final target deceleration rate Gf can be prevented in line with the intention of the driver to brake. In other words, with the first embodiment of the present invention, it is possible to maintain the final target deceleration rate Gf immediately before the master cylinder pressure Pm begins to decrease (peak hold), and an adequate braking effect can therefore be obtained. On the other hand, when the brake pedal 1 is depressed slowly with a smaller force, the decrease in the master cylinder pressure Pm may be what the driver intends. In such instances, the limiting value β is not set to a value as small as 0, and a certain level of decrease in the final target deceleration rate Gf will be allowed, thereby making it possible to match the braking intent of the driver.

When the brake pedal stroke Ss of the brake pedal 1 is in a relatively small region, a change in the brake pedal stroke Ss overtime will be considerably large. However, when the brake pedal stroke Ss is in a relatively large region, a change in the brake pedal stroke Ss overtime will be small. Therefore, even if the driver depresses the brake pedal 1 with a constant force, the increase amount ΔSs of the brake pedal stork Ss is decreased as the brake pedal stroke Ss increases. Therefore, in the first embodiment of the present invention, when the brake pedal stroke Ss is greater than the prescribed value S1, the limiting value β will be set to a smaller value and the limit will be made more stringent in comparison to when the brake pedal stroke Ss is smaller than the prescribed value S1 (step S11).

Thus, a situation is prevented in which the limit on the decrease of the final target deceleration rate Gf is alleviated despite the driver still wishing to decelerate and further depressing the brake pedal 1 because the increase amount ΔSs gradually decreases as the brake pedal stroke Ss increases.

Furthermore, in the first embodiment of the present invention, a so-called pump-up brake actuator is used in which the discharge pressure of the pumps 7f and 7r is directly used to generate braking force. Therefore, the controller 9 is configured to change the rotation of the drive motor according to the change in the final target deceleration rate Gf.

In such case, with a comparison example illustrated in FIG. 12, if the final target deceleration rate Gf fluctuates, the drive motor will temporarily drop from a state of high rotation to a state of low rotation, and will then change back to state of high rotation. The resulting change in motor noise during this time may irritate the driver. On the other hand, with the first embodiment of the present invention as described above, it is possible to mitigate the change in motor noise by limiting the decrease of the final target deceleration rate Gf, and thereby avoid irritating the driver. However, if a pair of accumulators is provided to the discharge-side channel of the pumps 7f and 7r (as in the second embodiment illustrated in FIG. 14), the rotation of the drive motor will not necessarily have to be changed in accordance with changes in the final target deceleration rate Gf.

Figure 13:
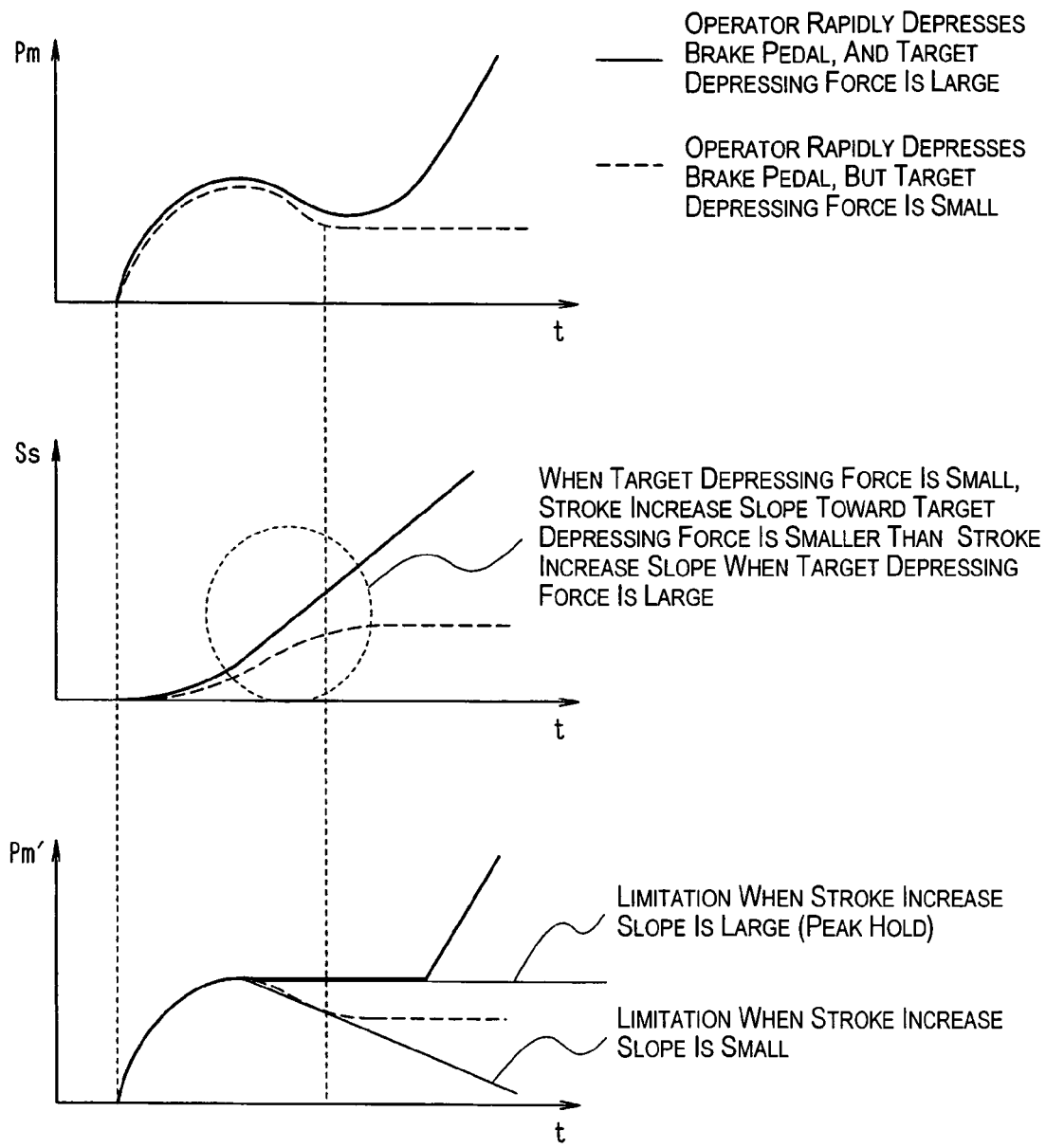
FIG. 13 is a time chart illustrating changes in the master cylinder pressure, the brake pedal stroke and the revised master cylinder pressure with respect to time in accordance with the first embodiment of the present invention.

In the first embodiment described above, the limiting value β is changed according to the brake pedal stroke Ss and the increase amount ΔSs as illustrated in FIG. 8. However, the limiting value β is not limited to be determined using the control map as shown in FIG. 8. The limiting value β may even be fixed at 0, thereby preventing a decrease in the final target deceleration rate Gf. In such case, as shown in FIG. 13, the final target deceleration rate Gf immediately before the master cylinder pressure Pm begins to decrease can be reliably maintained (peak hold) when the driver rapidly depresses the brake pedal.

In the first embodiment described above, the limiting value β is continuously changed according to the increase amount ΔSs in the process of step S11 (FIG. 8). However, the arrangement of the limiting value β is not limited to such arrangement. For example, the limiting value β may be changed in a stepwise manner according to the increase amount ΔSs, or merely in a single step. Furthermore, in the first embodiment, the characteristics of "ΔSs–β" are switched according to whether or not the brake pedal stroke Ss is greater than the prescribed value S1. However, the characteristics of "ΔSs–β" may be switched in multiple stages in accordance with the brake pedal stroke Ss.

Furthermore, in the first embodiment described above, the final target deceleration rate Gf is limited by limiting the decrease in the master cylinder pressure Pm in each calculation period to the limiting value β or less, and again calculating the revised target deceleration rate Gp' in accordance with the revised master cylinder pressure Pm'. However, the present invention is not limited to this arrangement. In short, it is sufficient if the decrease in the final target deceleration rate Gf can be limited to carry out the present invention. For example, the target deceleration rate Gp calculated in step S3 may be taken as the final target deceleration rate Gf, and limiting processing corresponding to steps S11 through S14 may be performed on the final target deceleration rate Gf.

Furthermore, in the processing of step S7 of the first embodiment, the contribution ratio α is continuously varied in accordance with the master cylinder pressure Pm (FIG. 6). However, the present invention is not limited to this arrangement. For example, the contribution ratio α may be varied in step form in accordance with the master cylinder pressure Pm, or may be varied in only a single stage (single step). Furthermore, in the first embodiment, the contribution ratio α is explained as a distribution ratio. In other words, in the first embodiment, the sum of the value α and the value (1−α) is a fixed value (1). However, the sum of the contribution degree of the target deceleration rate Gp and the contribution degree of the target deceleration rate Gs need not necessarily be a fixed value. For example, a configuration may be used in which one of the contribution degrees increases while the other remains unchanged, so that the sum of the contribution degrees increases.

Furthermore, in the processing of step S110 in the first embodiment, the contribution ratio α is calculated only in accordance with the master cylinder pressure Pm. However, the present invention is not limited to this arrangement. Specifically, it would also be possible to calculate the contribution ratio α only in accordance with the brake pedal stroke Ss, or to calculate the contribution ratio α in accordance with both the brake pedal stroke Ss and the master cylinder pressure Pm.

Furthermore, in the first embodiment described above, a hydraulic brake is employed in which fluid pressure is used as the transmission medium. However, the present invention is not limited to this arrangement. For example, an air brake in which compressed air is used as the transmission medium may also be employed.

Also, in the first embodiment described above, the brake-by-wire control utilizing fluid pressure is performed. However, the present invention is not limited to this arrangement as long as the braking force control can be performed. Accordingly, any type of brake may be used as long as an electronically controllable energy source is provided, such as electrical brakes in which disk rotors are clamped by brake pads, or brake shoes are pressed against the internal circumferential surfaces of brake drums, by controlling the driving of electrical actuators, recovery motor brakes or the like.

Furthermore, even if the stroke simulator 8 is not provided, there may be cases in which similar problems occur as a result of channel resistance during abrupt braking. Thus, the stroke simulator 8 is an optional component in the present invention.

Second Embodiment

Figure 14:
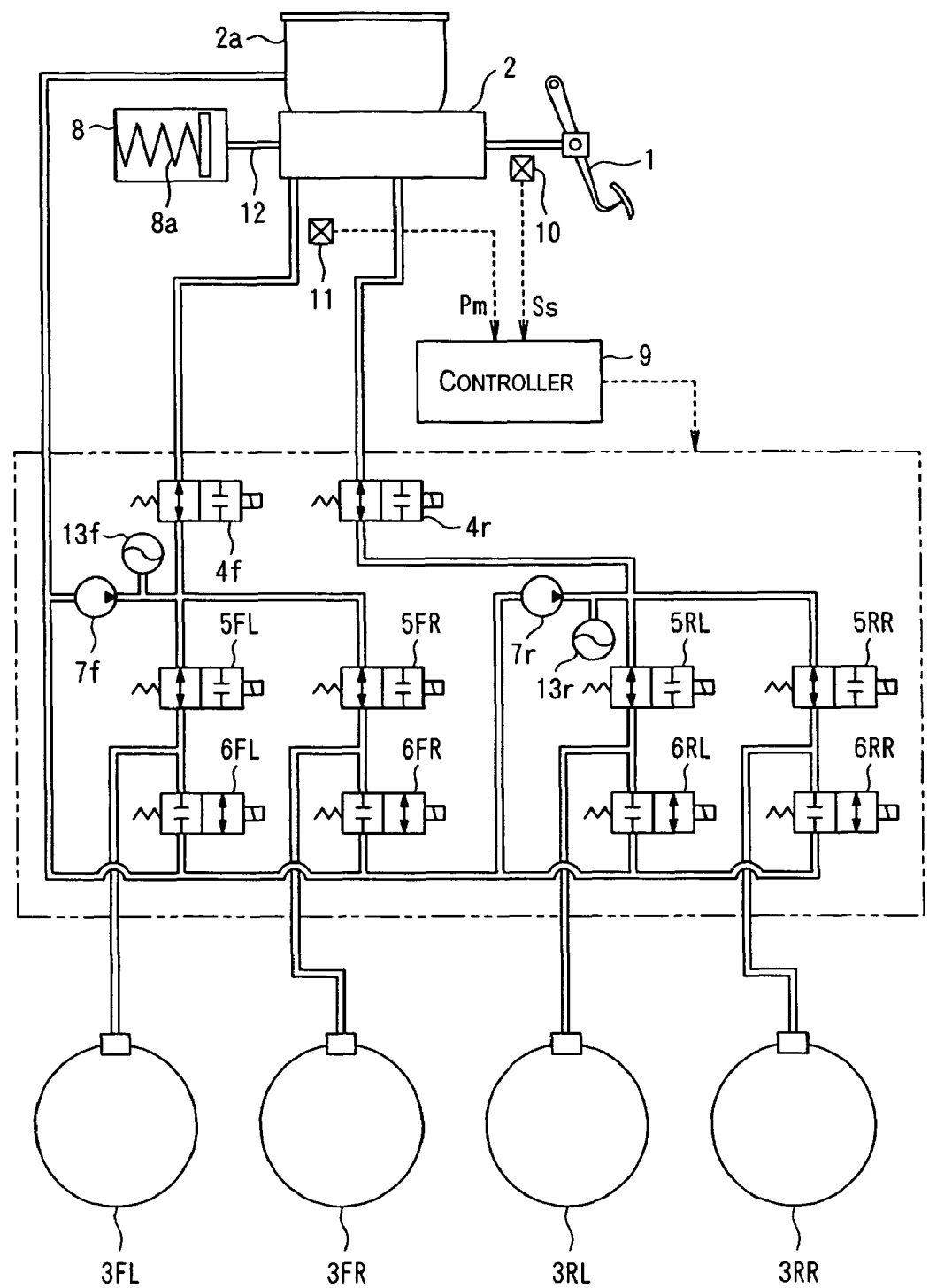
FIG. 14 is a schematic view of a vehicle brake system having an accumulator in which a vehicle brake device is provided in accordance with a second embodiment of the present invention.
Figure 15:
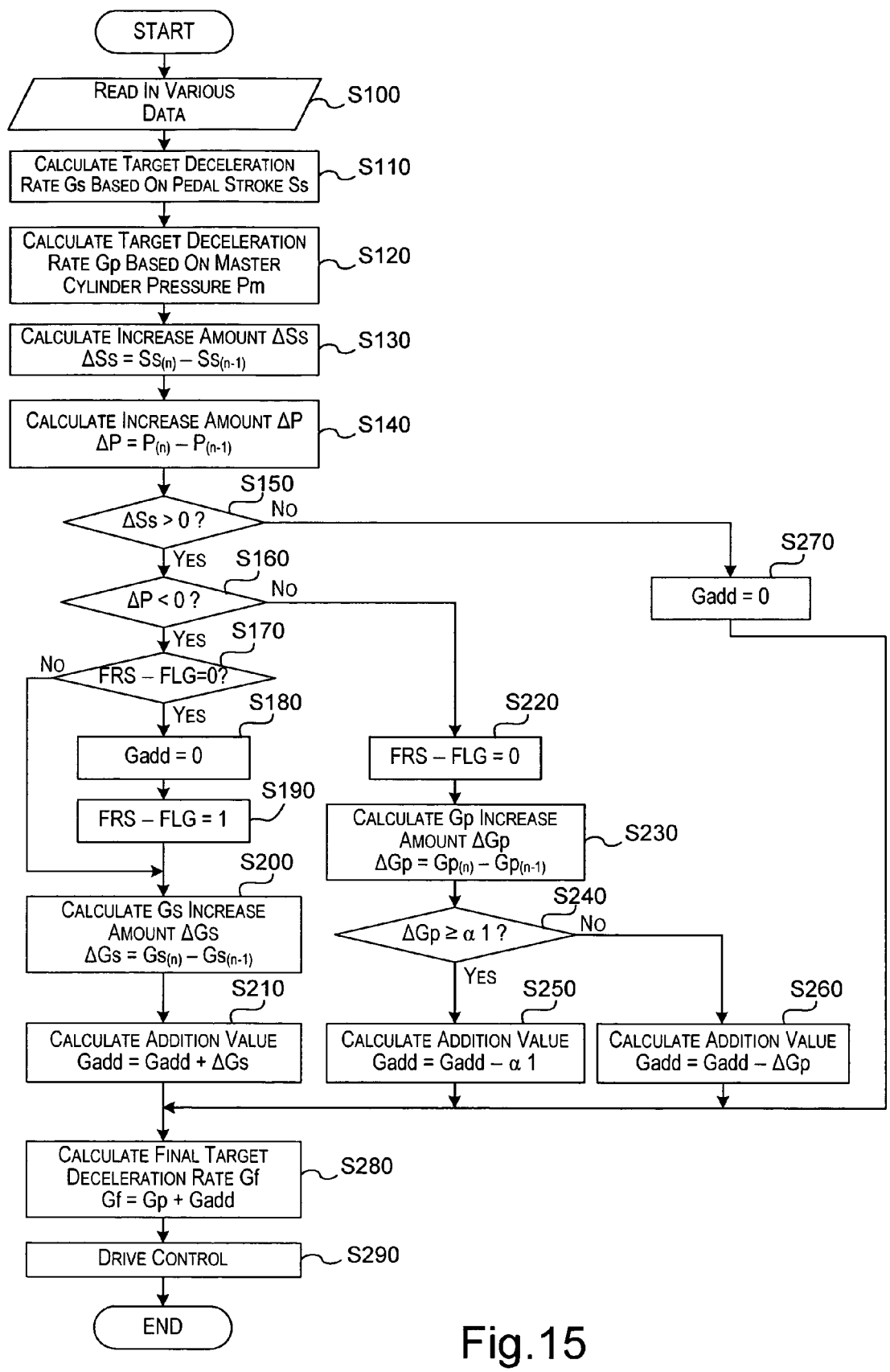
FIG. 15 is a flowchart illustrating a braking force control process executed in the vehicle brake device in accordance with the second embodiment of the present invention.
Figure 16:
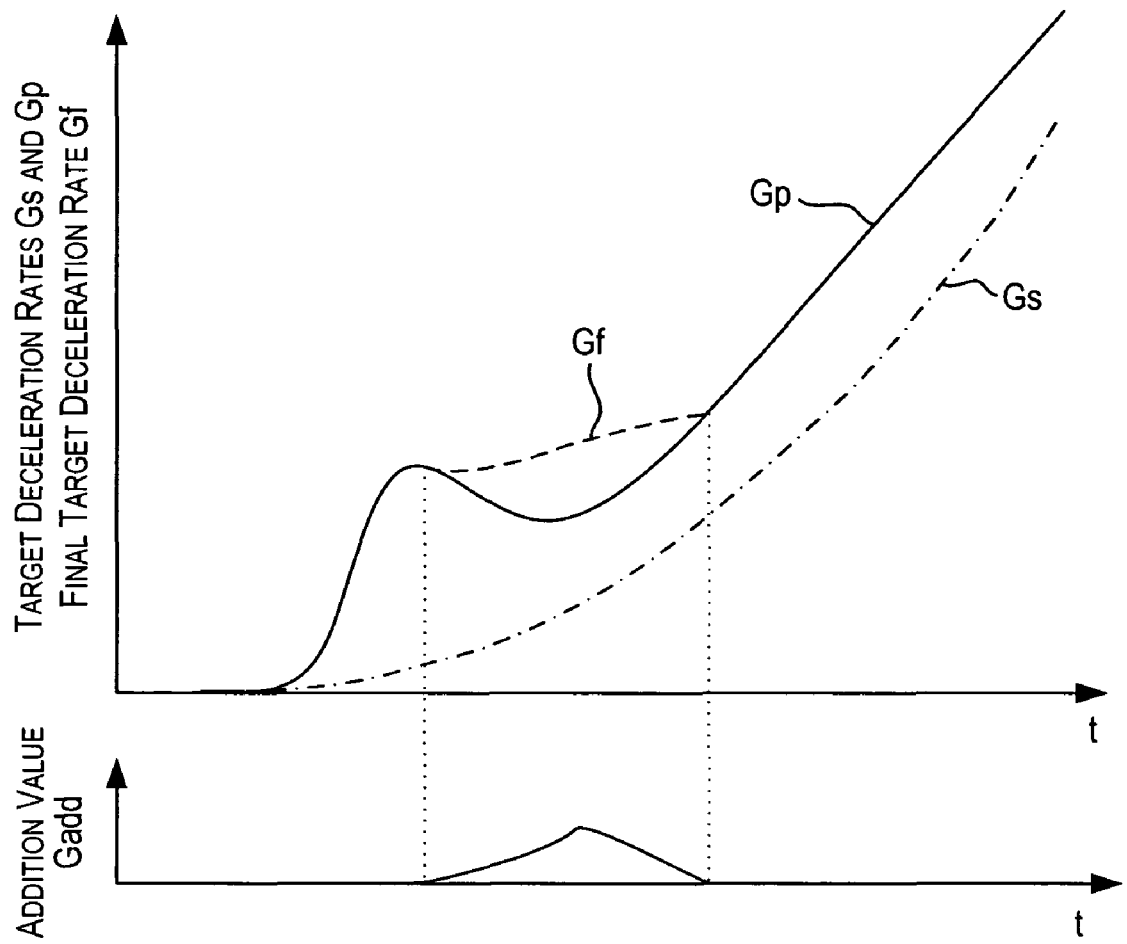
FIG. 16 is a time chart illustrating the operation effects in the target deceleration rate, the final target deceleration rate and the actual deceleration rate in accordance with the second embodiment.

Referring now to FIGS. 14 to 16, a vehicle brake device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle brake system of the second embodiment differs from the vehicle brake system of the first embodiment in that the vehicle brake system of the second embodiment further includes a pair of accumulators 13f and 13r. Also, the braking force control processing performed by the controller 9 in the second embodiment is different from the braking force control processing in the first embodiment.

Referring now to the flowchart of FIG. 15, the braking force control processing of the second embodiment will be described. The processing illustrated in FIG. 15 is performed using a timer interrupt each prescribed period of time (e.g., 10 msec).

First, in step S100, the controller 9 is configured to read in the brake pedal stroke Ss and master cylinder pressure Pm, and the processing proceeds to step S110.

In step S110, the controller 9 is configured to calculate the target deceleration rate Gs based on the brake pedal stroke Ss using the control map such as the one illustrated in FIG. 3. As mentioned above, the control map in FIG. 3 shows the brake pedal stroke Ss on the horizontal axis, and the target deceleration rate Gs on the vertical axis. The target deceleration rate Gs increases from zero as the brake pedal stroke Ss increases. Of course, it will be apparent from this disclosure of the present invention that the target deceleration rate Gs need not be zero when the brake pedal stroke Ss is zero. Then, the processing proceeds to step S120.

In step S120, the controller 9 is configured to calculate the target deceleration rate Gp in accordance with the master cylinder pressure Pm using the control map such as the one shown in FIG. 4. The control map in FIG. 4 shows the master cylinder pressure Pm on the horizontal axis and the target deceleration rate Gp on the vertical axis, and is set so that the target deceleration rate Gp increases proportionally from zero as the master cylinder pressure Pm increases from zero. Of course, it will be apparent from this disclosure of the present invention that the target deceleration rate Gp need not be zero when the master cylinder pressure Pm is zero. Then, the processing proceeds to step S130.

In step S130, the controller 9 is configured to calculate the increase amount ΔSs in the brake pedal stroke Ss by subtracting the previously sampled pedal stroke $Ss_{(n-1)}$ from the currently sampled pedal stroke $SS_{(n)}$ as shown in the equation (2) mentioned above. The processing then proceeds to step S140.

In step S140, the controller 9 is configured to calculate an increase amount ΔP in the master cylinder pressure Pm by subtracting the previously sampled master cylinder pressure $Pm_{(n-1)}$ from the currently sampled master cylinder pressure $Pm_{(n)}$ by using the equation (8) below. The processing then proceeds to step S150.

$$\Delta P = Pm_{(n)} - Pm_{(n-1)} \tag{8}$$

In step S150, the controller 9 is configured to determine whether or not the increase amount ΔSs is greater than zero. When the increase amount ΔSs is greater than zero, the processing proceeds to step S160. On the other hand, when the increase amount ΔSs is equal to or less than zero, the processing proceeds to step S270. In step S270, an addition value Gadd is cleared to zero, and the processing proceeds to step S280.

In step S160, the controller 9 is configured to determine whether or not the increase amount ΔP of the master cylinder pressure Pm is smaller than zero. When the increase amount ΔP is smaller than zero (i.e., the master cylinder pressure Pm has decreased in spite of the fact that the brake pedal stroke Ss of the brake pedal 1 has increased), the processing proceeds to step S170. When the increase amount ΔP is not smaller than zero, the processing proceeds to step S220.

In step S170, the controller 9 is configured to determine whether or not the value of a flag FRS-FLG is zero. When the value of the flag FRS-FLG is zero (i.e., a situation in which the master cylinder pressure Pm has decreased in spite of the fact that the brake pedal stroke Ss has increased occurs (the processing has shifted from step S150) occurred for the first time), the processing proceeds to step S190. On the other hand, when the value of the flag FRS-FLG is 1 (i.e., that this processing cycle is the second or subsequent time that the situation in which the master cylinder pressure Pm has decreased in spite of the fact that the brake pedal stroke Ss has increased occurs, the processing proceeds to step S200.

In step S180, the controller 9 is configured to clear the addition value Gadd (set the addition value Gadd to zero). Then, in step S190, the controller 9 is configured to set the value of the flag FRS-FLG to 1, and the processing proceeds to step S200.

In step S200, the controller 9 is configured to calculate an increase amount ΔGs by subtracting the previously calculated target deceleration rate $GS_{(n-1)}$ based on the brake pedal stroke Ss from the currently calculated target deceleration rate $GS_{(n)}$ based on the brake pedal stroke Ss by using the equation (9) below. The processing then proceeds to step S210.

$$\Delta Gs = Gs_{(n)} - Gs_{(n-1)} \tag{9}$$

In step S210, the controller 9 is configured to increase the addition value Gadd by an amount equal to the increase amount ΔGs by using the equation (10) below. The processing then proceeds to step S280.

$$Gadd = Gadd + \Delta Gs \tag{10}$$

On the other hand, if the controller 9 determines in step S1160 that the increase amount ΔP is equal to or greater than zero (ΔP≧0), the processing proceeds to step S220. In step S220, the controller 9 is configured to set the value of the flag FRS-FLG to zero, and the processing proceeds to step S230.

In step S230, the controller 9 is configured to calculate an increase amount ΔGp in the target deceleration rate Gp by subtracting the previously calculated target deceleration rate $Gp_{(n-1)}$ based on the master cylinder pressure Pm from the currently calculated target deceleration rate $Gp_{(n)}$ based on the master cylinder pressure Pm by using the equation (11) below. Then, the processing then proceeds to step S240.

$$\Delta Gp = Gp_{(n)} - Gp_{(n-1)} \tag{11}$$

In step S240, the controller 9 is configured to determine whether or not the increase amount ΔGp is equal to or greater than a prescribed value α1 (:>0). When the increase amount ΔGp is equal to or greater than the prescribed value α1, the processing proceeds to step S250. When the increase amount ΔGp is less than the prescribed value α1, the processing proceeds to step S260.

In step S250, the controller 9 is configured to decrease the addition value Gadd by an amount equal to the prescribed value α1 by using the equation (12) below.

$$Gadd = Gadd - α1 \quad (12)$$

However, in cases where the addition value Gadd is reduced to a value that is less than zero after the calculation of the equation (12) is executed, the addition value Gadd is set to zero. Then, the processing proceeds to step S280.

In step S260, the controller 9 is configured to decrease the addition value Gadd by an amount equal to the increase amount ΔGp by using the equation (13) below.

$$Gadd = Gadd - ΔGp \quad (13)$$

However, in cases where the addition value Gadd is reduced to a value that is less than zero after the calculation of the equation (13) is executed, the addition value Gadd is set to zero. Then, the processing proceeds to step S280.

In step S280, the controller 9 is configured to calculate the final target deceleration rate Gf by adding the addition value Gadd to the target deceleration rate Gp based on the master cylinder pressure Pm by using the equation (14) below. Then, the processing proceeds to step S290.

$$Gf = Gp + Gadd \quad (14)$$

In step S290, the controller 9 is configured to control operations of the gate valves 4f and 4r, the inlet valves 5FL through 5RR, the outlet valves 6FL through 6RR and the pumps 7f and 7r so that the braking force required in order to achieve the final target deceleration rate Gf is generated. Then, the processing returns to a prescribed main program.

In the second embodiment of the present invention, since the final target deceleration rate Gf is calculated based on the target deceleration rate Gp according to the master cylinder pressure Pm which rises more quickly than the brake pedal stroke Ss when the brake pedal 1 is rapidly depressed. Accordingly, the braking response when the brake pedal 1 is rapidly depressed is good in the second embodiment of the present invention.

Furthermore, in cases where the brake pedal 1 is rapidly depressed, as described above, the master cylinder pressure Pm may temporarily drop in spite of the fact that the brake pedal stroke Ss has increased. In such case, in the second embodiment, since the increase amount ΔGs in the target deceleration rate Gs based on the increased brake pedal stroke Ss is always added, the drop in the final target deceleration rate Gf caused by the drop in the master cylinder pressure Pm is limited. Specifically, the drop in the response characteristics caused by the drop in the final target deceleration rate Gf can be restricted.

Furthermore, in the second embodiment of the present invention, the difference (increase amount) ΔGs in the target deceleration rate Gs of each cycle is added in steps S200 and S210 to determine the increase in the target deceleration rate Gs based on the brake pedal stroke Ss. However, it would also be possible to calculate the addition value Gadd which is the amount of increase in the target deceleration rate Gs based on the brake pedal stroke Ss from the difference between the target deceleration rate Gs immediately prior to the drop in the master cylinder pressure Pm and the current target deceleration rate Gs.

Following the driver rapidly depressing the brake pedal 1, the master cylinder pressure Pm rises. In other words, when the brake pedal stroke Ss increases and the master cylinder pressure Pm also rises, the target deceleration rate Gp based on the master cylinder pressure Pm can be used as the final target deceleration rate Gf by gradually decreasing the addition value Gadd, which is a correction value. As a result, the braking intention of the driver can be accurately reflected in the braking control. In this case, furthermore, since the addition value Gadd is gradually decreased toward zero, abrupt changes in the final target deceleration rate Gf can be avoided, so that any strange feeling in braking while the addition value Gadd (the correction value) is returned to zero can be avoided.

Furthermore, when the brake pedal stroke Ss increases and the master cylinder pressure Pm also increases, the occurrence of a strange feeling accompanying the deceleration request being outputted in the opposite direction from the operation of the driver can be suppressed by gradually decreasing the addition value Gadd in the range where an increase slope of the final target deceleration rate Gf can be maintained.

Specifically, in the second embodiment, in cases where the increase amount ΔGp in the target deceleration rate Gp is equal to or greater than the prescribed value α1, the addition value Gadd is decreased by the prescribed value α1 which is smaller than the increase amount ΔGp. Accordingly, in cases where there is a depression of the brake pedal 1 at a prescribed rate or greater, the final target deceleration rate Gf can be reliably maintained in the increasing slope. Furthermore, in cases where the rate of depression of the brake pedal 1 by the driver is slow (i.e., in cases where the increase amount ΔGp is smaller than the prescribed value α1), the addition value Gadd is decreased by an amount equal to the increase amount ΔGp, so that the final target deceleration rate Gf is prevented from having a decreasing slope. Furthermore, it would also be possible to omit step S240, and to decrease the addition value Gadd in step S250. In such case, for example, the amount subtracted is set smaller than the increase amount ΔGp by subtracting a prescribed value γ from the increase amount ΔGp by using the equation (15) below.

$$Gadd = Gadd - (ΔGP - γ) \quad (15)$$

However, in cases where the prescribed value γ is equal to or larger than the increase amount ΔGp (i.e., ΔGP≦γ), the prescribed value γ is set to, for example, zero.

FIG. 16 shows a time chart illustrating the operating example in accordance with the second embodiment. In FIG. 16, the final target deceleration rate Gf is basically equal to the target deceleration rate Gp. However, in a situation where the master cylinder pressure Pm drops so that the target deceleration rate Gp drops in spite of the fact that the brake pedal stroke Ss has increased, the drop in the final target deceleration rate Gf is limited by the addition value Gadd as indicated by the broken line in FIG. 16. Furthermore, as shown in FIG. 16, the addition value Gadd increases as the master cylinder pressure Pm drops. Then, as the master cylinder pressure Pm switches over to an increase, the addition value Gadd gradually decreases to zero.

In the second embodiment of the present invention, as described above, in cases where the master cylinder pressure Pm decreases in spite of a temporary increase in the brake pedal stroke Ss as a result of the driver rapidly depressing the brake pedal 1, the addition value Gadd is incrementally increased by adding the increase amount ΔGs in the target deceleration rate Gs based on the brake pedal stroke Ss, so that the drop in the final target deceleration rate Gf is suppressed. Then, in a state in which the master cylinder pressure Pm increases with an increase in the brake pedal stroke Ss, the above-mentioned addition value Gadd is decreased toward zero. In this case, the processing of steps S200 and S210 is performed as a result of the operator again rapidly depressing the brake pedal 1 during the increase of the pedal stroke. If processing is continuously performed in which the increase amount ΔGs is added to the addition value Gadd, the increase in the addition value Gadd may become excessive. As a result, the final target deceleration rate Gf will be corrected by an amount that is greater than necessary. In the second embodiment, such excessive correction is prevented. Specifically, when the operator depresses the brake pedal 1 again, even if a state in which the master cylinder pressure Pm decreases in spite of a temporary increase in the brake pedal stroke Ss as a result of the driver rapidly depressing the pedal occurs two or more times, processing that subtracts the addition value Gadd is performed in steps S250 and S260. In other words, when a state in which the master cylinder pressure Pm decreases in spite of a temporary increase in the brake pedal stroke Ss as a result of the driver rapidly depressing the pedal again occurs, the addition value Gadd is reduced to zero or a value close to zero, and the addition value Gadd is reliably cleared to zero by the processing of steps S170 through S190, so that an excessive correction is prevented.

In the second embodiment, when the brake pedal stroke Ss is zero or negative in step S150 (i.e., when the position of the brake pedal 1 is maintained or returned), the addition value Gadd is unconditionally cleared to zero. However, the present invention is not limited to this arrangement. It would also be possible to gradually reduce the addition value Gadd by the absolute value of the increase amount ΔGp (ordinarily a negative value in this state) in the target deceleration rate Gp based on the master cylinder pressure Pm, or by respective values that are slightly larger than the increase amount ΔGp by using the equation (16) below.

$$Gadd = Gadd - |\Delta G| - \delta (\delta > 0) \quad (16)$$

Accordingly, with the vehicle brake device according to the present invention, reduction of the target deceleration rate can be limited when the driver brakes quickly. Therefore, the situation in which the braking command is outputted in the opposite direction relative to the actions of the driver can be reduced.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle brake device comprising:
    a brake operating element configured and arranged to be operated by a driver of a vehicle;
    a master cylinder operatively coupled to the brake operating element, and configured and arranged to generate a fluid pressure in accordance with an operation of the brake operating element; and
    a controller configured to calculate a target deceleration rate based on the fluid pressure of the master cylinder and to control a braking force of the vehicle in accordance with the target deceleration rate,
    the controller being further configured to limit a decrease in the target deceleration rate while the target deceleration rate is being decreased in response to a decrease in the fluid pressure of the master cylinder that occurs while an operation amount of the brake operating element by the driver increases,
    the controller being further configured to add an addition value to the target deceleration rate to limit the decrease in the target deceleration rate, the controller being further configured to increase the addition value in response to the controller determining both an increase of the operation amount of the brake operating element by the driver and the decrease in the fluid pressure of the master cylinder.

2. The vehicle brake device according to claim 1, wherein the controller is further configured to limit a decrease rate in the target deceleration rate during the abrupt deceleration.

3. The vehicle brake device according to claim 1, wherein the controller is further configured to determine that the abrupt deceleration occurs based on a brake stroke of the brake operating element when an operating speed of the brake operating element exceeds a prescribed value, and the controller is further configured to limit the decrease in the target deceleration rate while the target deceleration rate is being decreased due to a decrease in the fluid pressure of the master cylinder.

4. The vehicle brake device according to claim 1, wherein the controller is further configured to set a limiting value that is used to restrict the decrease in the target deceleration rate so that the target deceleration rate is substantially prohibited from decreasing.

5. The vehicle brake device according to claim 2, wherein the controller is further configured to determine that the abrupt deceleration occurs based on a brake stroke of the brake operating element when an operating speed of the brake operating element exceeds a prescribed value, and the controller is further configured to limit the decrease in the target deceleration rate while the target deceleration rate is being decreased due to a decrease in the fluid pressure of the master cylinder.

6. A vehicle brake device comprising:
a brake operating element configured and arranged to be operated by a driver of a vehicle;
a master cylinder operatively coupled to the brake operating element, and configured and arranged to generate a fluid pressure in accordance with an operation of the brake operating element; and
a controller configured to calculate a target deceleration rate based on the fluid pressure of the master cylinder and to control a braking force of the vehicle in accordance with the target deceleration rate,
the controller being further configured to limit a decrease in the target deceleration rate during an abrupt deceleration caused by the operation of the brake operating element by the driver,
the controller being further configured to determine that the abrupt deceleration occurs when the fluid pressure decreases while an operation amount of the brake operating element increases,
the controller being further configured to add an addition value to the target deceleration rate to limit the decrease in the target deceleration rate, the controller being further configured to increase the addition value in response to the controller determining both an increase of the operation amount of the brake operating element by the driver and the decrease in the fluid pressure of the master cylinder.

7. The vehicle brake device according to claim 6, wherein the controller is further configured to limit a decrease rate in the target deceleration rate during the abrupt deceleration.

8. The vehicle brake device according to claim 6, wherein the controller is further configured to determine that the abrupt deceleration occurs based on a brake stroke of the brake operating element when an operating speed of the brake operating element exceeds a prescribed value, and the controller is further configured to limit the decrease in the target deceleration rate while the target deceleration rate is being decreased due to a decrease in the fluid pressure of the master cylinder.

9. A vehicle brake device comprising:
a brake operating element configured and arranged to be operated by a driver of a vehicle;
a master cylinder operatively coupled to the brake operating element, and configured and arranged to generate a fluid pressure in accordance with an operation of the brake operating element; and
a controller configured to calculate a target deceleration rate based on the fluid pressure of the master cylinder and to control a braking force of the vehicle in accordance with the target deceleration rate,
the controller being further configured to limit a decrease in the target deceleration rate during an abrupt deceleration caused by the operation of the brake operating element by the driver,
the controller being further configured to add an addition value calculated based on an increase in an operation amount of the brake operating element to the target deceleration rate to limit the decrease in the target deceleration rate while the target deceleration rate is being decreased due to a decrease in the fluid pressure of the master cylinder.

10. The vehicle brake device according to claim 9, wherein the controller is configured to gradually decrease the addition value.

11. The vehicle brake device according to claim 9, wherein the controller is further configured to limit a decrease rate in the target deceleration rate during the abrupt deceleration.

12. A vehicle brake device comprising:
a brake operating element configured and arranged to be operated by a driver of a vehicle;
a master cylinder operatively coupled to the brake operating element, and configured and arranged to generate a fluid pressure in accordance with an operation of the brake operating element; and
a controller configured to calculate a target deceleration rate based on the fluid pressure of the master cylinder and to control a braking force of the vehicle in accordance with the target deceleration rate,
the controller being further configured to limit a decrease in the target deceleration rate during an abrupt deceleration caused by the operation of the brake operating element by the driver,
the controller being further configured to determine that the abrupt deceleration occurs based on a brake stroke of the brake operating element when an operating speed of the brake operating element exceeds a prescribed value,
the controller being further configured to limit the decrease in the target deceleration rate while the target deceleration rate is being decreased due to a decrease in the fluid pressure of the master cylinder, and
the controller being further configured to add an addition value calculated based on an increase in an operation amount of the brake operating element to the target deceleration rate to limit the decrease in the target deceleration rate.

13. A vehicle brake device comprising:
driver operable brake operating means for receiving a brake command from a driver of a vehicle;
fluid pressure generating means for generating a fluid pressure in accordance with the brake command of the driver received by the driver operable brake operating means;
controlling means for calculating a target deceleration rate in accordance with the fluid pressure generated by the fluid pressure generating means and for controlling a braking force of the vehicle in accordance with the target deceleration rate; and
control limiting means for limiting a decrease in the target deceleration rate while the target deceleration rate is being decreased in response to a decrease in the fluid pressure that occurs while an operation amount of the brake command by the driver increases,
the control limiting means further performing a function for adding an addition value to the target deceleration rate to limit the decrease in the target deceleration rate, and for increasing the addition value in response to determining both an increase of the operation amount of the brake command by the driver and the decrease in the fluid pressure.

14. A vehicle braking method comprising:

calculating a target deceleration rate in accordance with a master cylinder fluid pressure of a master cylinder operatively coupled to a driver operable brake operating element;

limiting a decrease in the target deceleration rate while the target deceleration rate is being decreased in response to a decrease in the master cylinder fluid pressure of the master cylinder that occurs while an operation amount of the driver operable brake operating element by a driver increases;

controlling a vehicle braking force in accordance with the target deceleration rate;

the limiting of the decrease in the target deceleration rate including adding an addition value to the target deceleration rate to limit the decrease in the target deceleration rate, and increasing the addition value in response to determining both an increase of the operation amount of the brake command by the driver and the decrease in the master cylinder fluid pressure.

* * * * *